United States Patent [19]

Passaro et al.

[11] 4,119,419
[45] Oct. 10, 1978

[54] SMOKE CONTROLLING ASH TRAY

[76] Inventors: Anthony Passaro, 2440 Prospect Ave., Bronx, N.Y. 10458; Nicholas Joseph Parmigiano, 2560 Seymour Ave., Bronx, N.Y. 10469

[21] Appl. No.: 748,224

[22] Filed: Dec. 7, 1976

[51] Int. Cl.² ............... B01D 46/46; A24F 19/09
[52] U.S. Cl. ............................. 55/212; 55/274; 55/385 G; 55/DIG. 34; 131/238
[58] Field of Search .......... 55/212, 271, 274, 385 G, 55/442, 481, DIG. 34, 210, 217, DIG. 36; 131/232, 234, 235 R, 242, 240 GG, 263, 231, 238; 340/237 S; 98/115 R, 39; 236/49

[56] References Cited

U.S. PATENT DOCUMENTS

| | | | |
|---|---|---|---|
| 1,739,367 | 12/1929 | Love | 55/442 |
| 2,015,334 | 9/1935 | Bernhardt | 131/234 |
| 2,384,414 | 9/1945 | Antrim | 55/442 |
| 2,657,090 | 10/1953 | Meek | 131/242 |
| 3,249,037 | 3/1966 | Stalker | 55/DIG. 36 |
| 3,516,232 | 6/1970 | Gilbertson | 55/385 G |
| 3,635,282 | 1/1972 | Watanabe | 236/49 |
| 3,797,205 | 3/1974 | Weisskopf | 55/385 G |
| 3,817,161 | 6/1974 | Koplon | 98/39 |
| 3,884,133 | 5/1975 | Miller | 236/49 |
| 3,952,753 | 4/1976 | Klinger | 131/235 R |
| 3,958,965 | 5/1976 | Rackowski | 55/385 G |

FOREIGN PATENT DOCUMENTS 1,031,266 6/1953 France .................................. 55/481

Primary Examiner—Frank W. Lutter
Assistant Examiner—David L. Lacey
Attorney, Agent, or Firm—Leonard W. Suroff

[57] ABSTRACT

An ash tray comprising a housing having a passageway on the upper end thereof communicating with the interior of the housing, with support means operatively associated with the housing for supporting thereon a cigarette or cigar with its lighted end adjacent to the passageway. A fan is mounted within the housing so constructed and arranged as to create a draft of air through the passageway in a downward direction, and smoke detector means is operatively connected to the fan and contained within the housing, with the smoke detector means adapted to detect the presence of smoke adjacent the passageway so as to obtain electrical energization of the fan such that smoke from the lighted cigarette or cigar is carried into the housing by the draft of air created by the fan. A purifier filter is mounted in the housing between the fan and the passageway so as to obtain a filtering of the smoke prior to the air exiting from the housing. An alarm is operatively associated with the smoke detector means to provide an audible signal when smoke enters the housing, and first switch means is electrically connected to the fan and the alarm such that the fan may be deactivated and the ash tray acts as a smoke detector.

20 Claims, 4 Drawing Figures

SMOKE CONTROLLING ASH TRAY

BACKGROUND OF THE INVENTION

1. Field Of The Invention

The present invention relates to an ash tray, and more particularly to one having a smoke detector associated therewith, as well as an alarm such that the ash tray may be utilized for varying functions.

2. Description Of The Prior Art

Ash tray having built-in fans and fans and filter devices have been disclosed in the prior art for the purpose of drawing air and smoke from a lighted cigarette or cigar when the same is placed on the ash tray. Certain of these devices are disclosed in U.S. Pat. Nos. 2,092,192; 2,788,085; 3,516,232; and 3,807,148.

In contrast to the above prior art we have found that it is possible to provide an ash tray that operates or functions for a number of specific purposes. One of these purposes being to automatically respond to the presence of smoke in order to create the necessary air current through the ash tray to purify the air and remove the cigarette or cigar smoke therefrom. Another feature of the present invention, compared to the prior art is to utilize the smoke detector in conjunction with an alarm to automatically provide an audible signal. In this manner the ash tray may be used for people who smoke at night and might fall asleep, which is the cause of many home fires. The advantages and distinctions of my invention over the prior art will become more clearly evident as the disclosure proceeds.

OBJECTS OF THE INVENTION

An object of the present invention is to provide an ash tray of this kind in which a filter is used to diffuse the smoke and a fan is used to draw the smoke-laden air through the filter.

Another object of the present invention is to provide an ash tray having fan means associated therewith which is activated by a smoke detector.

Another object of the present invention is to provide an ash tray including a fan means adapted to draw the smoke through a filter means, the fan means being powered by either batteries or other source of electrical energy.

Another object of the present invention is to provide an ash tray that also functions as a smoke detector to provide an audible signal within the home, office, or where else it is used.

Another object of the present invention is to provide an ash tray that may also be used for the lighting of a cigarette.

Another object of the present invention is to provide an ash tray device including means for filtering smoke which is economical to manufacture, durable in use and refined in appearance.

Other objects and advantages will become apparent as the disclosure proceeds.

SUMMARY OF THE INVENTION

An ash tray comprising a housing having a passageway on the upper end thereof communicating with the interior of the housing, with support means operatively associated with the housing for supporting thereon a cigarette or cigar with its lighted end adjacent to the passageway.

A fan is mounted within the housing so constructed and arranged as to create a draft of air through the passageway in a downward direction, and smoke detector means is operatively connected to the fan and contained within the housing, with the smoke detector means adapted to detect the presence of smoke adjacent the passageway so as to obtain electrical energization of the fan such that smoke from the lighted cigarette or cigar is carried into the housing by the draft of air created by the fan. A purifier filter is mounted in the housing between the fan and the passageway so as to obtain a filtering of the smoke prior to the air exiting from the housing.

Mounting means is provided in the housing for supporting the filter in a manner such that the filter is removable from the mounting means through an opening in the housing through which the filter is removable for replacement thereof. An air outlet panel in operative relationship to the housing and positioned rearwardly of the fan, such that the draft of air created by the fan exits the housing through the outlet panel is also provided.

Another feature of the present invention is that heating means is provided including an element operatively associated with the housing which when electrically energized is operative to ignite the end of a cigarette brought proximate a surface of the heating element.

The ash tray of the present invention also includes baffle means including a plurality of vertically extending plates in spaced apart relationship to each other, with each plate having an upper end below the height of the fan, such that ashes may be permitted to accumulate in the baffle means as the smoke is processed by the fan.

Another feature of the present invention is that of providing an alarm operatively associated with the smoke detector means to provide an audible signal when smoke enters the housing, and first switch means electrically connected to the fan and the alarm such that the fan may be deactivated and the ash tray acts as a smoke detector only. In addition, second switch means is operatively connected to the fane so as to energize the fan at a first speed when the ash tray is to be used with means for increasing the speed of the fan when the presence of smoke is detected by the smoke detector means, and means for decreasing the speed of the fan when the presence of smoke in the air ceases.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
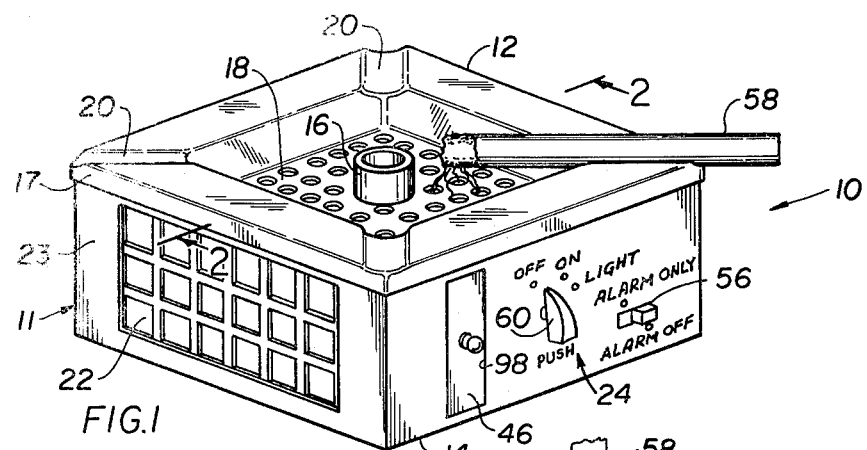
FIG. 1 is a perspective view of the ash tray in accordance with the present invention.
Figure 2:
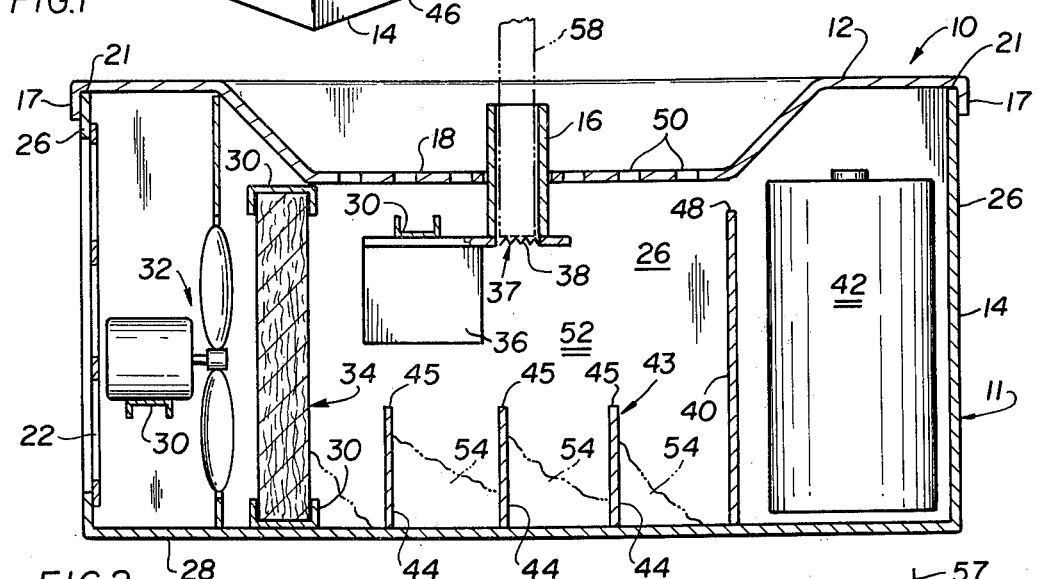
FIG. 2 is a sectional view taken along lines 2—2 of FIG. 1 to more fully illustrate the present invention.
Figure 3:
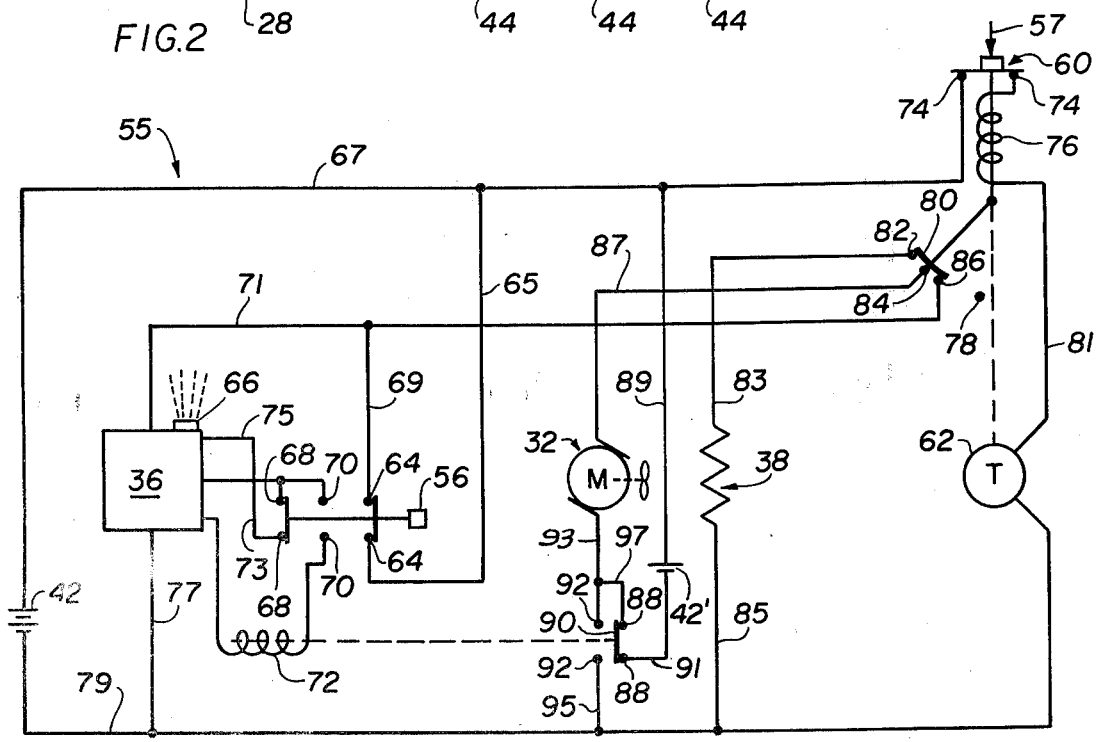
FIG. 3 is a schematic view of the electrical circuitry of the invention illustrated in FIGS. 1 and 2.

Referring to the drawings, there is illustrated in FIGS. 1-3 preferred embodiment of an ash tray device 10 having a housing 11 formed of a top cover 12 removably connected to a base 14. Supporting means in the form of a lighting tube 16 projects upwardly from the center of recessed tray 18, which tray is used for the reception of cigarette ashes and butts and is formed above the cover 12. The cover 12 may have a circumferentially extending lip 17 to enclose the open end 21 of the housing 14. The tube 16 supports a cigarette in a vertical position for lighting same. Recessed seats 20 are provided at each corner of the cover 12 for the resting thereon of cigarettes and cigars. An air outlet panel 22 with a porous grill that is placed on one face or surface 23 of the base 14 while another face or surface has controls 24 mounted thereon.

Base 14 comprises four upstanding walls 26, that may extend vertically, and a floor section or bottom 28 topped by the cover tray 12. Mounted within the housing 14 on cross channel members 30, or the like, are a motor-fan assembly 32, air purifier-filter 34, smoke detector 36, and heating means 37 including a lighting element 38. Wall panel 40 separates the air-ash compartment 52 from power source 42, which may be in the form of one or more batteries. Baffle means 43 includes baffle plates 44 which are provided and serve to collect ashes 54 and deflect the air stream towards the smoke detector 36.

The baffle plates 44, three being shown, extend transversely across the floor section 28 between the wall panel 40 and the purifier-filter 34. Each plate 44 has an upper end 45 which is below the upper end 48 of wall panel 40 and the height of the purifier-filter 34. Air filter access panel 46 covers an opening in wall 26 that serves for removal and replacement of the disposable purifier-filter 34. A passageway in the form of a plurality of holes 50 in tray 18 allows for the ambient air to be drawn into compartment 52 when motor fan 32 is in operation. The motor fan 32 being mounted between the purifier filter 34 and the air outlet panel 22. Control means 55 is used for the device 10 in its first mode or function which is designed to allow the user to light a cigarette and filter fouled ambient air in a controlled cycle. A second mode of operation or function which is to allow for the smoke detector 36 to sound an alarm is also regulated by the control means 55. The fouled ambient air is passed through the purifier-filter 34 when the fan assembly 32 is operational.

In this manner the device 10 can perform more than one function by utilization of the control means of FIG. 3. When used in the first mode, first switch means or switch 56 is set in the alarm "Off" position. The operator inserts a cigarette 58, which will come to rest on element 38, into tube 16. Second switch means or switch 60 is then grasped, pushed inwardly in the direction of arrow 57 and turned clockwise to the "Light" position as indicated on surface 24. A timer 62 maintains voltage on heating element 38 for a sufficient time to light cigarette 58 the tip of which touches element 38.

The user then smokes the cigarette 58 in the usual manner. Timer 62 via switch 60 maintains motor 32 at a first speed or in a running standby condition as well as supplying voltage to smoke detector 36. If the user employs other means to light the cigarette, he need only switch 60 to the "On" position.

When the device 10 is used in a second or smoke detector-alarm mode, timer 62 will have advanced to the "Off" position and the operator will move switch 56 to "Alarm Only" position. FIG. 3 shows switch 56 in the "Alarm Only" position. Voltage from battery 42 is supplied to smoke detector 36 through contacts 64. One contact 64 coupled by leads 65 and 67 to one end of the battery 42. The other contact 64 is coupled by leads 69 and 71 to the smoke detector 36. The circuit through alarm device 66 is completed through contacts 68 associated with switch 56 by leads 73 and 75. Lead 77 and 79 connects the detector 36 to the battery 42.

When the device 10 is used in the first mode, switch 56 is moved to the right or "Alarm Off" position. This will open contacts (deactivates alarm) 64 and 68 and close contacts 70 across polarized coil 72. When the operator pushes on switch knob 60 current flows through contacts 74 and into "self-holding" solenoid coil 76 which is connected by lead 81 to timer 62. Switch 60 will stay in "pulled in" position until timer 62 moves wiper arm 80 to "Off" position 78. Lead 79 connects the battery 42 to the timer 62.

When the operator turns switch 60 to "Light" position wiper arm 80 will complete circuits through contacts 82, 84 and 86. Contact 82 will supply voltage to lighting resistor 38 by lead 83. The resistor element is connected to battery 42 by leads 85 and 79. Timer 62 is set to disengage arm 80 from contact 82 after a timer adequate to light the cigarette 58.

Arm 80 connects contact 84 and supplies voltage from battery 42' via contacts 88 to motor 32 by lead 87. This allows fan 32 to run at low speed. Contact 86 supplies voltage from battery 42 to smoke detector 36 via lead 71.

With arm 80 in position, shown in FIG. 3, element 38 is "hot" and cigarette 58 begins to burn. Smoke detector 36 is activated to signal coil 72 which moves contactor 90 from contacts 88 to contacts 92. This action puts full voltage on motor 32 from battery 42 which speeds up to full speed. Lead 89 connects one end of the battery 42' to lead 67 and in turn to battery 42. Lead 91 connects the other side of battery 42' to contact 88. Lead 93 connects motor 32 to one of the contacts 92, and lead 95, via lead 79 is connected to one end of battery 42. Lead 97 joins one contact 88 with the motor 32. This situation remains until clean air is being drawn in through holes 50 in tray 18. When the air is clean, coil 72 releases contactor 90 from contacts 92 to contacts 88, and motor 32 runs at low speed again. Thus, when the cigarette is brought close to the ash tray 10 or rests therein, the fan 32 will run at high speed drawing the fouled air through purifier filter 32 and discharges through panel 22. Battery 42 may be of higher voltage than battery 42' to provide more power and increased speed.

After a desired time, the timer 62 moves arm 80 to the "Off" position, and the unit is automatically shut down. The timing of timer 62 may vary.

Cover 12 is vertically removable from the base 14 for cleaning and servicing of the unit. In this manner the accumulated ashes 54 may be removed. Accordingly, the tube 16 acts as the retaining means to maintain the cigarette 58 in a vertical position through the cover 12. The cover 12 may take various forms and shapes. The smoke detector 36 may be of a type well known in the art today that is designed to be battery powered. The smoke detector 36 may have the alarm 66 built into it in a conventional manner. In this way the device 10 can function for a variety of uses and provide a home safety purpose as well. Many fires are not detected in time, the ash tray 10 can now be set at night in the "Alarm Only" position, in which position if smoke is in the vicinity of the ash tray 10 the alarm will go on.

In this manner a novel ash tray has been disclosed which is designed to process smoke and air through a filter and yet be readily opened, when the batteries 42 and 42' have to be changed. Therefore, a truely universal ash tray that has safety features associated with it is provided. The panel 46 may extend within an opening 98 on the wall 26 so as to remove the filter 34 when necessary. That type of filter 34 may be replaced from time to time and made from a conventional type of filter material.

Figure 4:
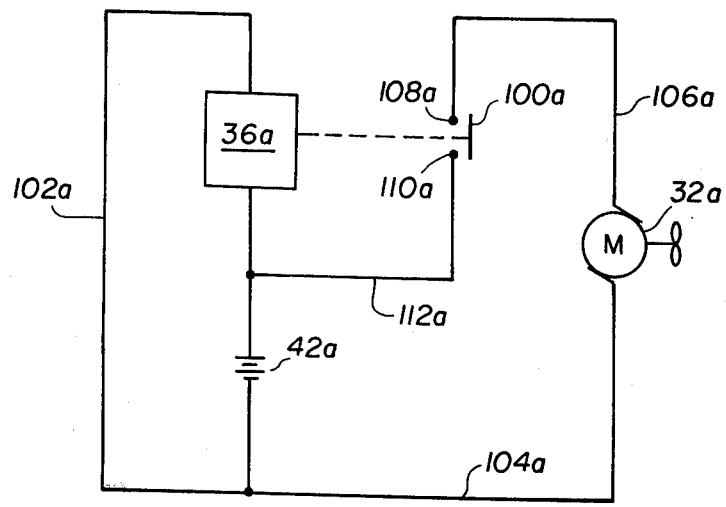
FIG. 4 is a schematic view of the electrical circuitry of an alternate embodiment of the present invention.

FIG. 4 illustrates another embodiment of the invention in which certain of the interrelated components are utilized to form an ash tray having certain novel features, and that may be housed in the same housing as illustrated in FIGS. 1 and 2.

In this embodiment the fan 32a is coupled to the smoke detector 36a and the system is powered by battery 42a. Lead 102a connects battery 42a to the smoke detector 36a, and the other end of battery 42a is also connected to smoke detector 36a for powering same. Lead 104a connects motor 32a to battery 42a, and lead 106a connects motor 32a to terminal 108a of switch 100a. Terminal 110a is connected by lead 112a to battery 42a. When smoke from a cigarette or cigar is detected by smoke detector 36a, it automatically closes switch 100a so as to energize motor 32a. When the source of smoke is removed, the switch 100a automatically opens.

Although illustrative embodiments of the invention have been described in detail herein with reference to the accompanying drawings, it is to be understood that the invention is not limited to the precise embodiments and that various changes and modifications may be effected therein without departing from the scope or spirit of the invention.

I claim:

1. An ash tray, comprising:
   a. a housing having a passageway on one end thereof communicating with the interior of said housing and a plurality of openings for the passage of smoke into said housing,
   b. support means positioned on said housing for supporting thereon a cigarette or cigar with its lighted end adjacent to said passageway,
   c. fan mounted within said housing so constructed and arranged as to create a draft of air through said passageway in a singular direction,
   d. porous air outlet means arranged on said housing and positioned rearwardly of said fan, such that the draft of air created by said fan exits said housing through said porous outlet means,
   e. smoke detector means operatively connected to said fan and contained within said housing, said smoke detector means adapted to detect the presence of smoke adjacent said passageway so as to obtain electrical energization of said fan such that smoke from the lighted cigarette or cigar is carried into said housing by the draft of air created by said fan,
   f. control means electrically connected to said fan and said smoke detector means to automatically energize or deenergize said fan in response to the presence or absence of smoke adjacent to said smoke detector means, respectively,
   g. at least one battery in said housing electrically connected to said fan for powering same,
   h. a purifier filter mounted in said housing between said fan and said passageway so as to obtain a filtering of the smoke prior to exiting from said housing, and
   i. mounting means in said housing for supporting said filter in a manner such that said filter is removable from said housing.

2. An ash tray as in claim 1, and including an opening in said housing through which said filter is removable for replacement thereof.

3. An ash tray as in claim 1, and including heating means, coupled to said housing and including an element which when electrically energized is operative to ignite the end of a cigarette brought proximate a surface of said heating element.

4. An ash tray, comprising
   a. a housing having a passageway on one end thereof communicating with the interior of said housing,
   b. support means positioned on said housing for supporting thereon a cigarette or cigar with its lighted end adjacent to said passageway,
   c. a fan mounted within said housing so constructed and arranged as to create a draft of air through said passageway in a singular direction,
   d. porous air outlet means arranged on said housing and positioned rearwardly of said fan, such that the draft of air created by said fan exits said housing through said porous outlet means,
   e. smoke detector means operatively connected to said fan and contained within said housing, said smoke detector means adapted to detect the presence of smoke adjacent said passageway so as to obtain electrical energization of said fan such that smoke from the lighted cigarette or cigar is carried into said housing by the draft of air created by said fan,
   f. control means electrically connected to said fan and said smoke detector means to automatically energize or deenergize said fan in response to the presence or absence of smoke adjacent to said smoke detector means, respectively,
   g. heating means coupled to said housing, and including an element which when electrically energized is operative to ignite the end of a cigarette brought proximate a surface of said heating element, and
   h. retaining means positioned with respect to said heating means so as to support a cigarette against the surface of said element.

5. An ash tray as in claim 4, and including at least one battery in said housing electrically connected to said fan for powering same.

6. An ash tray as in claim 4, and including baffle means in said housing in substantial alignment with said passageway for the accumulation of ashes.

7. An ash tray, comprising:
   a. a housing having a passageway on one end thereof communicating with the interior of said housing,
   b. support means positioned on said housing for supporting thereon a cigarette or cigar with its lighted end adjacent to said passageway,
   c. a fan mounted within said housing so constructed and arranged as to create a draft of air through said passageway in a singular direction,
   d. porous air outlet means arranged on said housing and positioned rearwardly of said fan, such that the draft of air created by said fan exits said housing through said porous outlet means,
   e. smoke detector means operatively connected to said fan and contained within said housing, said smoke detector means adapted to detect the presence of smoke adjacent said passageway so as to obtain electrical energization of said fan such that smoke from the lighted cigarette or cigar is carried into said housing by the draft of air created by said fan, f. control means electrically connected to said fan and said smoke detector means to automatically energize or deenergize said fan in response to the presence or absence of smoke adjacent to said smoke detector means, respectively, g. baffle means in said housing in substantial alignment with said passageway for the accumulation of ashes, and h. said baffle means includes a plurality of vertically extending plates in spaced apart relationship to each other, each said plate having an upper end below the top of said fan, such that ashes may be permitted to accumulate in said baffle means as the smoke is processed by said fan.

8. An ash tray comprising:
a. a housing having a passageway on one end thereof communicating with the interior of said housing,
b. support means positioned on said housing for supporting thereon a cigarette or cigar with its lighted end adjacent to said passageway,
c. a fan mounted within said housing so constructed and arranged as to create a draft of air through said passageway in a singular direction,
d. porous air outlet means arranged on said housing and positioned rearwardly of said fan, such that the draft of air created by said fan exits said housing through said porous outlet means,
e. smoke detector means operatively connected to said fan and contained within said housing, said smoke detector means adapted to detected the presence of smoke adjacent said passageway so as to obtain electrical energization of said fan such that smoke from the lighted cigarette or cigar is carried into said housing by the draft of air created by said fan,
f. control means electrically connected to said fan and said smoke detector means to automatically energize or deenergize said fan in response to the presence or absence of smoke adjacent to said smoke detector means, respectively,
g. an alarm coupled to said smoke detector means to provide an audible signal when smoke enters said housing, and
h. first switch means electrically connected to said fan and said alarm such that said fan may be deactivated and the ash tray acts as a smoke detector.

9. An ash tray as in claim 8, and including second switch means operatively connected to said fan so as to energize said fan at a first speed when the ash tray is to be used.

10. An ash tray as in claim 9, and including means for increasing the speed of said fan when the presence of smoke is detected by said smoke detector means.

11. An ash tray as in claim 10, and including means for decreasing the speed of said fan when the presence of smoke in the air ceases.

12. An ashtray, comprising in combination:
a. a housing having a passageway on one end thereof communicating with the interior of said housing,
b. support means positioned on said housing for supporting thereon a cigarette or cigar with its lighted end adjacent to said passageway,
c. a fan mounted within said housing so constructed and arranged as to create a draft of air through said passageway in a downward direction,
d. smoke detector means operatively connected to said fan and contained within said housing, said smoke detector means adapted to detect the presence of smoke adjacent said passageway,
e. control means electrically connected to said fan and said smoke detector means to automatically energize or deenergize said fan in response to the presence or absence of smoke adjacent to said smoke detector means,
f. a purifier filter mounted in said housing between said fan and said passageway so as to obtain a filtering of the smoke prior to the air exiting from said housing,
g. a porous air outlet panel in operative relationship to said housing and positioned rearwardly of said fan, such that the draft of air created by said fan exits said housing through said outlet panel,
h. baffle means in said housing in substantial alignment with said passageway for accumulation of ashes, said baffle means including a plurality of vertically extending plates in spaced apart relationship to each other, each plate having an upper end below the top of said fan, such that ashes may be permitted to accumulate in said baffle means as the smoke is processed by said fan,
i. an alarm connected to said smoke detector means to provide an audible signal when smoke enters said housing, and
j. first switch means electrically connected to said fan and said alarm such that said fan may be deactivated and the ash tray acts as a smoke detector.

13. An ash tray as in claim 12, wherein said ash tray includes a plurality of openings for the passage of ashes and smoke into the ash tray.

14. An ash tray as in claim 12, and mounting means in said housing for supporting said filter in a manner such that said filter is removable from said mounting means.

15. An ash tray as in claim 12, and including:
a. heating means including an element positioned on said housing which when electrically energized is operative to ignite the end of a cigarette brought proximate a surface of said heating element, and
b. retaining means positioned with respect to said heating means so as to support a cigarette against the surface of said element.

16. An ash tray as in claim 15, and including timing means electrically connected to said heating means so as to energize same for a select period of time.

17. An ash tray as in claim 12, and including at least one battery in said housing electrically connected to said fan for powering same.

18. An ash tray as in claim 17, and including means for decreasing the speed of said fan when the presence of smoke in the air ceases.

19. An ash tray as in claim 12, and including:
a. second switch means operatively connected to said fan so as to energize said fan at a first speed when the ash tray is to be used, and
b. means for increasing the speed of said fan when the presence of smoke is detected by said smoke detector means.

20. An ash tray as in claim 12,
a. wherein said housing includes a base having upwardly extending walls and a cover removable from said base, said base having a bottom wall from which said plates extend, b. said passageway extending through said cover to the interior of said housing, c. wherein said support means comprises recessed seats on said cover in which a cigarette may be positioned, d. cross channels in said housing between said upwardly extending walls from which said fan and smoke detector are mounted, e. said air outlet panel is mounted on one of said upwardly extending walls, f. heating means including an element coupled to said housing which when electrically energized is operative to ignite the end of a cigarette brought proximate a surface of said heating element.

g. retaining means positioned with respect to said heating means so as to support a cigarette against the surface of said element, h. said retaining means including a tubular member extending through said cover and adapted to support the cigarette in substantially a vertical position.

* * * * *